United States Patent [19]

Kazami et al.

[11] Patent Number: 4,984,005
[45] Date of Patent: Jan. 8, 1991

[54] PHOTOGRAPHING MODE SWITCHING DEVICE OF A CAMERA

[75] Inventors: Kazuyuki Kazami; Toshiyuki Nakamura, both of Tokyo; Hiroshi Wakabayashi, Yokohama, all of Japan

[73] Assignee: Nikon Corporation, Tokyo, Japan

[21] Appl. No.: 513,027

[22] Filed: Apr. 25, 1990

Related U.S. Application Data

[63] Continuation of Ser. No. 197,148, May 23, 1988, abandoned.

[30] Foreign Application Priority Data

Jun. 3, 1987 [JP] Japan .................................. 62-139584

[51] Int. Cl.[5] .............................................. G03B 7/00
[52] U.S. Cl. ..................................... 354/412; 354/419; 354/289.1
[58] Field of Search ............. 354/149.1, 173.1, 173.11, 354/217, 289.1, 412, 419, 442

[56] References Cited

U.S. PATENT DOCUMENTS 4,357,087 11/1982 Ikawa et al. ................... 354/149.11
4,734,727 3/1988 Takemae .............................. 354/412

Primary Examiner—L. T. Hix
Assistant Examiner—David M. Gray
Attorney, Agent, or Firm—Shapiro and Shapiro

[57] ABSTRACT

A camera capable of operation in continuous photography and one-frame photography modes has an automatically activated flash device the operation of which may be inhibited by the user when desired. In a preferred embodiment, when the camera is in the continuous photography mode and the user has inhibited the flash device, the inhibition of the flash device is maintained upon completion of continuous photography. One-frame photography may be performed while the camera is in the continuous photography mode, and while maintaining inhibition of the flash device, by momentary depression of the shutter release button. If the camera is operated in the one-frame photography mode and the flash device is inhibited, inhibition of the flash device is automatically cancelled after each exposure.

9 Claims, 4 Drawing Sheets

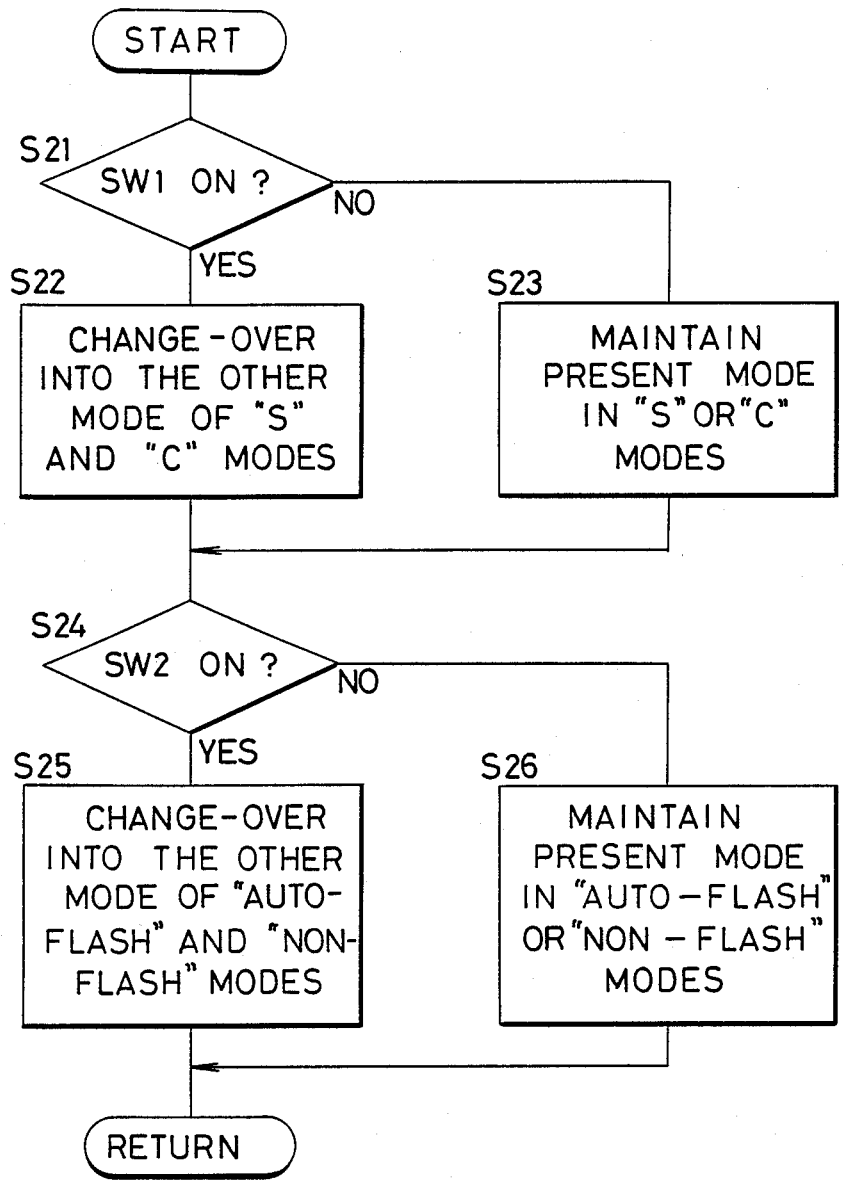

PHOTOGRAPHING MODE SWITCHING DEVICE OF A CAMERA

This is a continuation of application Ser. No. 197,148 filed May 23, 1988, now abandoned.

BACKGROUND OF THE INVENTION

1. Field of the Invention

The present invention relates to a camera with an automatic flash that may be inhibited by a user.

2. Related Background Art

In a conventional camera with a built-in flash device, an auto-flashing mode is provided to automatically activate the flash device in a photographing operation when an object of a low brightness or in a back light is detected. On the other hand, a flash inhibit mode may be manually set to inhibit the auto-flashing when the auto-flash mode is automatically set.

In a conventional camera, however, the flash inhibit mode is automatically released at the end of one-frame photographing, in order to prevent a user of the camera from photographing the next frame while he/she forgets that he/she has set the flash inhibit mode in the previous photographing so that the failure of the auto-flashing in spite of a low brightness object is prevented. Accordingly, in an environment where the flash inhibit mode is to be continuously maintained, the flash inhibit mode has to be set at the end of each one-frame photographing.

SUMMARY OF THE INVENTION

It is an object of the present invention to provide a device which allows continuous maintenance of a flash inhibit mode.

In accordance with the invention, a first selection means selects one of a plurality of selectable control modes (e.g., flash and non-flash modes). Photographing means executes photography in accordance with the control mode selected by the first selection means. Second selection means selects one of a plurality of selectable exposure modes, including a first exposure mode (e.g., one-frame photography) in which the control mode (e.g., non-flash) selected by the first selection means is automatically changed into another of the control modes (e.g., auto-flash) in response to completion of the photography executed by the photographing means, and a second exposure mode (e.g., continuous photography) in which the control mode (e.g., non-flash) selected by the first selection means is continued after completion of photography executed by the photographing means.

BRIEF DESCRIPTION OF THE DRAWINGS

FIG. 4 shows a flow chart illustrating a photographing mode setting sub-routine.

DETAILED DESCRIPTION OF THE PREFERRED EMBODIMENTS

Figure 1:
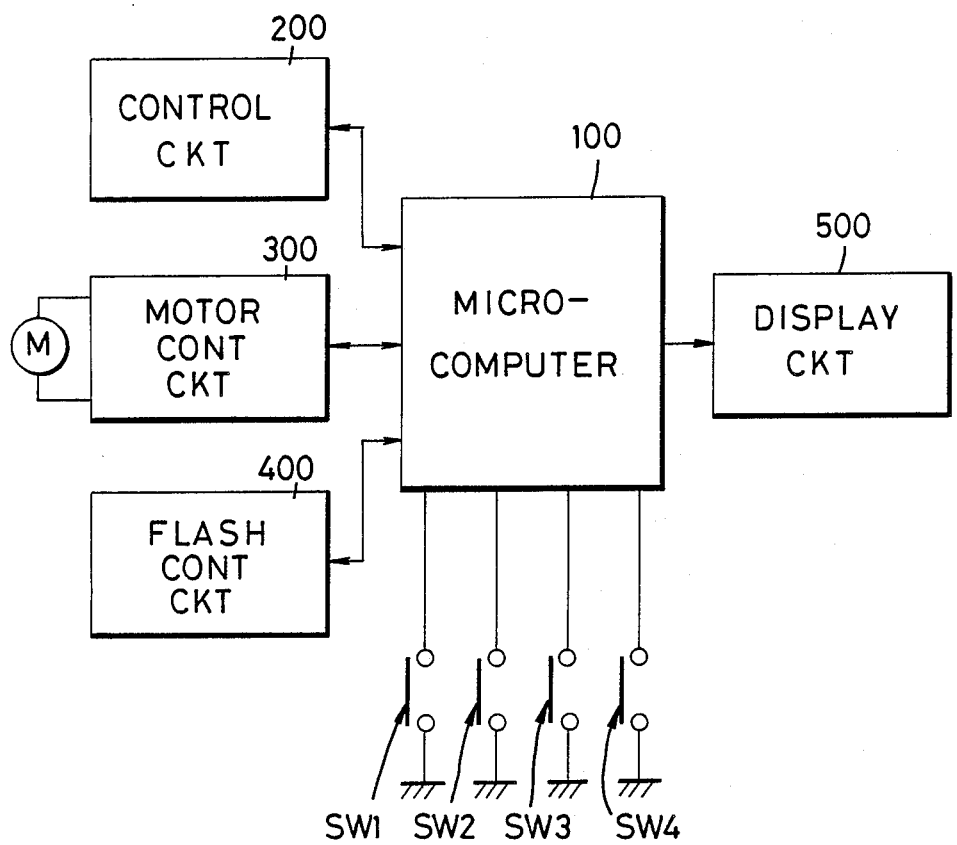
FIG. 1 shows a block diagram of one embodiment of the present invention.

FIG. 1 shows a block diagram of one embodiment of the photographing mode switching device.

In FIG. 1, a microcomputer 100 comprises a CPU, a memory and input/output ports. Connected to the input/output ports of the microcomputer 100 are input/output terminals of a control circuit 200, a motor control circuit 300, a flash control circuit 400 and a display circuit 500 so that they are operated under the instruction of the microcomputer 100 in accordance with the states of switches $Sw_1$–$Sw_4$.

The switches are explained below. $Sw_1$ denotes a C-S selection switch. Each time it is turned on, the photographing mode is switched between a continuous photographing mode (C mode) in which a plurality of frames are continuously photographed while a release member is actuated, and a normal photographing mode (S mode) in which photographing is terminated after one or several frames have been photographed even if the release member is actuated.

$Sw_2$ denotes a flash mode selection switch. When it is turned on while a camera is in an auto-flash mode, a flash inhibit mode to inhibit the automatic flashing is set. The switches $Sw_1$ and $Sw_2$ are in on states only while they are actuated, and they are reset to off states when they are deactuated.

$Sw_3$ and $Sw_4$ denote switches which respond to the actuation of a shutter release button. When the release button is depressed to a first stroke position, the switch $Sw_3$ is turned on, and when the release button is depressed to a second stroke position or fully, the switch $Sw_4$ is turned on.

The control circuit 200 includes a light measurement circuit, a distance measurement circuit and an exposure control circuit, and controls photographing operations such as measurement of brightness of an object field, measurement of distance to the object and control of exposure by a diaphragm and a shutter, under the instruction of the microcomputer 100.

The motor control circuit 300 controls the drive of a film feed Motor M under the instruction of the microcomputer 100.

The film feed motor M takes up a leader portion of a film in response to the depression of the release button when the film has been loaded in a camera so that a first frame is positioned to face an exposure aperture. It also takes up one frame of film each time the frame is exposed, and rewinds the film when the exposure of all frames of the film is detected.

The flash control circuit 400 controls the flashing in the auto-flash mode in accordance with the brightness of the object field measured under the control of the control circuit 200, and inhibits the flashing in the flash inhibit mode irrespective of the state of the object field.

The display circuit 500 displays the setting of the continuous photographing mode or the normal photographing mode, and the flash inhibit mode or the auto-flash mode, on the exterior of a camera housing or in a finder view field by a liquid crystal display.

The operation of the photographing mode switching device is now explained.

Figure 2:
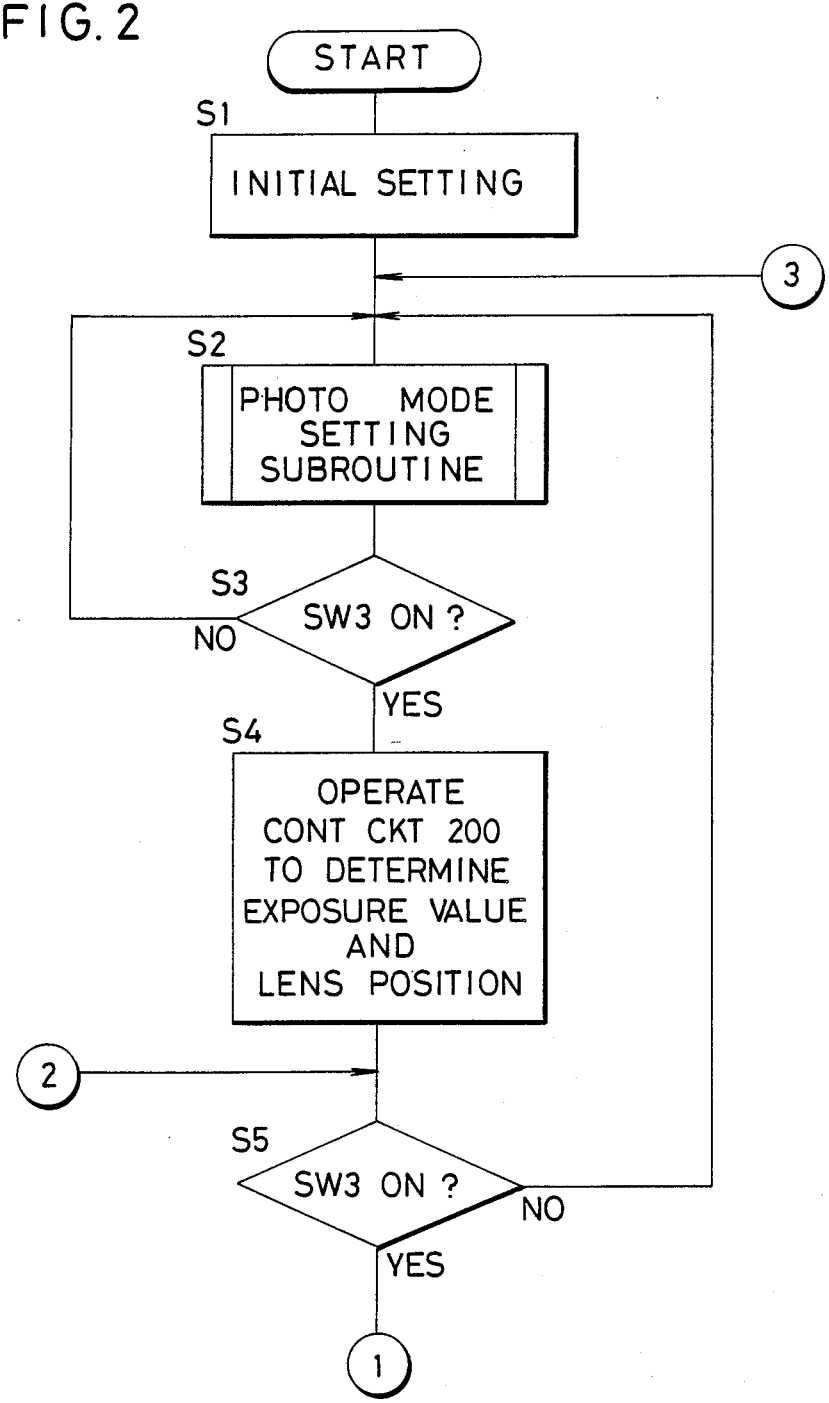
FIGS. 2 and 3 show flow charts illustrating an operation of the embodiment.
Figure 3:
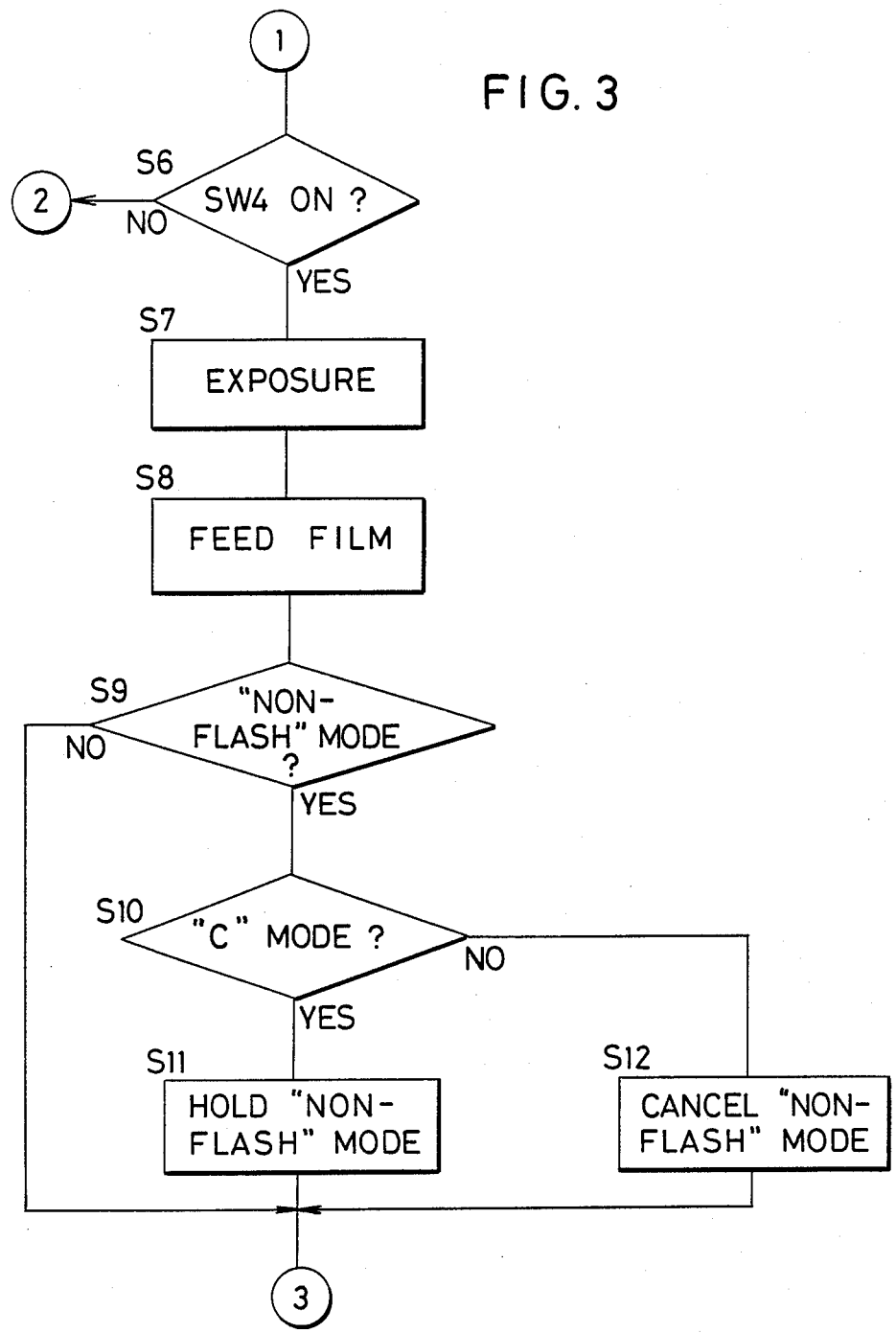

FIGS. 2 and 3 show flow charts illustrating a series of photographing operations.

When a power switch (not shown) is actuated to power on the microcomputer, the CPU of the microcomputer is initialized so that the normal photographing mode and the auto-flash mode are preselected (step S1).

In a step S2, a photographing mode setting subroutine is executed. The photographing mode setting process is explained with reference to FIG. 4.

When the photographing mode setting process is started, the CPU of the microcomputer checks whether the C-S selection switch $Sw_1$ has been turned on or not (step S21). If the switch $Sw_1$ has been actuated to command the change of the photographing mode, the CPU instructs the control circuit 200 to switch the mode from the initially set normal photographing mode to the continuous photographing mode, and causes the display circuit 500 to externally display the selection of the continuous photographing mode (step S22).

On the other hand, if the step S21 detects that the C-S selection switch $Sw_1$ has not been turned on, the mode change between the continuous photographing mode and the normal photographing mode is not effected and the initially set normal photographing mode is maintained. The display circuit 500 externally displays the selection of the normal photographing mode (step S23).

In a step S24, whether the flash mode selection switch $Sw_2$ has been turned on or not is checked. If the switch $Sw_2$ has been turned on, the flash inhibit mode is selected and the selection of the flash inhibit mode is externally displayed by the display circuit 500 (step S25).

On the other hand, if the decision in the step S24 is NO, that is, if the flash mode selection switch $Sw_2$ has not been turned on, the flash inhibit mode is not selected and the initially set auto-flash mode is maintained. The selection of the auto-flash mode is externally displayed by the display circuit 500 (step S26).

After the photographing mode has been set in the sub-routine, the process returns to a step S3 of FIG. 2 to check whether the switch $Sw_3$ which responds to the depression of the release button to the first stroke position has been turned on or not. If the switch $Sw_3$ has been turned on, the process proceeds to a step S4 where the operation of the control circuit 200 is started to determine exposure or stop value and shutter speed for an object brightness. Further, a distance to the object is determined and a position of an imaging lens to attain an optimum focus is determined. In a step S5, whether the switch $Sw_3$ has been turned on or not is again checked. If the switch $Sw_3$ has been turned on, whether the release button has been fully depressed to turn on the switch $Sw_4$ or not is checked as shown in FIG. 3. If the switch $Sw_4$ has been turned on, the diaphragm, shutter and imaging lens are controlled based on the exposure value and lens position determined in the step S4 and the film is exposed (step S7). After the exposure has been completed, the motor control circuit 300 drives the motor M to take up the film (step S8). In a step S9, the flash mode setting is checked, and if the flash inhibit mode has been set, the process proceeds to a step S10 where the continuous photographing mode setting is checked. If the continuous photographing mode has been set, the flash inhibit mode is retained in the next photographing operation (step S11). On the other hand, if the normal photographing mode rather than the continuous photographing mode has been set, the flash inhibit mode is released and the auto-flash mode is restored (step S12). The maintenance or release of the flash inhibit mode in the step S11 or S12 is effected only when the flash inhibit mode has been set by the flash mode selection switch $Sw_2$. When the auto-flash mode has been set, the auto-flash mode is maintained after one frame or several frames have been exposed irrespective of the continuous photographing mode or the normal photographing mode.

After the maintenance or release of the flash inhibit mode has been completed in the step S11 or S12, the next photographing operation is started.

On the other hand, if the decision in the step S3 of FIG. 2 is NO, that is, if the switch $Sw_3$ has not been turned on, the process returns to the photographing mode setting process of the sub-routine.

If the decision in the step S5 is NO, that is, if the switch $Sw_3$ has not been turned on, the process returns to the photographing mode setting process of the sub-routine.

In the step S3 or S5, if the switch $Sw_3$ has not been turned on, that is, if the release button has not been depressed or the depression has been terminated, the microcomputer repeatedly executes the loop including the sub-routine of FIG. 4. Unless the switch $Sw_1$ is actuated by the operator during this period, the decision in the step S21 is negative and the mode is maintained in the step S23. If the operator again actuates the switch $Sw_1$, the mode is changed in the step S22. Unless the switch $Sw_2$ is actuated by the operator during this period, the decision in the step S24 is negative and the mode is maintained in the step S26. If the operator again actuates the switch $Sw_2$, the mode is changed in the step S25.

The above process of repetitive loop is terminated when a main power switch of the camera is turned off.

If the decision in the step S6 of FIG. 3 is NO, that is, if the switch $Sw_4$ has not been turned on, the process returns to the step S5 where whether the release button has been depressed to the first stroke position or not is checked.

If the decision in the step S9 is NO, that is, if the flash inhibit mode has not been set, the auto-flash mode is maintained and the next photographing operation is started.

In the present embodiment, if the continuous photographing mode is set and the flash inhibit mode is also set, the flash inhibit mode is maintained.

Thus, if the operator desires photographing in the flash inhibit mode, he/she actuates the flash selection switch $Sw_2$ to select the flash inhibit mode and also actuates the C-S selection switch $Sw_1$ to select the continuous photographing mode. Under this condition, non-flash continuous photographing of the object may be performed by maintaining depression of the release button and non-flash one-frame photographing may be performed by momentary depression of the release button for each frame.

In the present embodiment, when the flash mode selection switch $Sw_2$ is actuated to inhibit flashing, the flashing is inhibited irrespective of the brightness of the object. Many variations of the invention are possible, such as using switch $SW_2$ to change from a frequent photographic mode to an infrequent photographic mode. Also a switch may be provided, for example, to select a mode in which the flash is forcibly fired in the exposure operation irrespective of the brightness of the object. Other variation include providing one or more of an exposure correction switch to shift the exposure value from an optimum exposure value, a switch to set the operation of a self-timer, an auto-focus adjusting switch, a multiple exposure switch to allow multiple exposure on the same frame or a switch for selecting a spot measurement mode in which a limited portion of the object field is measured.

In the step S10 of the present embodiment, the C-S mode selection switch $Sw_1$ is monitored and the non-flash mode is maintained if the continuous photographing mode has been set. Alternatively, in addition to the C-S mode selection switch $Sw_1$, a switch may be provided which is actuated in order to maintain the non-flash photographing mode if the one-frame photographing mode has been set, and the state of the additional switch may be monitored.

We claim:

1. A camera comprising:
   first selection means for selecting any one of a plurality of selectable control modes;
   photographing means for executing photography in accordance with the control mode selected by said first selection means; and
   second selection means for selecting any one of a plurality of selectable exposure modes, including a first exposure mode in which the control mode selected by said first selection means is automatically changed to another of said control modes in response to completion of photography executed by said photographing means and a second exposure mode in which the control mode selected by said first selection means is continued after completion of photography executed by said photographing means.

2. A camera according to claim 1 further comprising manually operated release means for causing said photographing means to start executing photography, and wherein said first exposure mode is a normal photographing mode for exposing only a predetermined number of frames when said release means is manually operated, and said second exposure mode is a continuous photographing mode for exposing successive frames continuously as long as said release means is manually operated.

3. A camera according to claim 1 further comprising a flash device and flash control means for causing said flash device to illuminate an object in response to detection of insufficient brightness of said object, wherein said plurality of control modes include a mode in which said flash control means is enabled and a mode in which said flash control means is disabled.

4. A camera comprising:
   means for setting a selectable control mode to a first control mode;
   first means for executing photography in accordance with said first control mode when said first control means has been set;
   means for changing the set control mode to a second control mode;
   second means for executing photography in accordance with said second control mode when said second control mode has been set; and
   means for selecting any one of a plurality of selectable exposure modes, including a first exposure mode in which said second control mode is automatically changed to said first control mode in response to completion of photography in accordance with said second control mode and a second exposure mode in which said second control mode is continued after completion of photography in accordance with said second control mode.

5. A camera according to claim 4 further comprising:
   flash means for automatically flashing in response to detection of insufficient brightness of an object; and
   means for inhibiting the automatic flashing in response to setting of said second control mode.

6. A camera comprising:
   first selection means for selecting either one of selectable first and second control modes;
   photographing means for executing photography in accordance with the control mode selected by said first selection means; and
   second selection means, adapted to be operated when said second control mode has been selected, for selecting one of a plurality of selectable exposure modes, including a first exposure mode in which said second control mode is automatically changed to said first control mode in response to completion of photography executed by said photographing means and a second exposure mode in which said second control mode is continued after completion of photography executed by said photographing means.

7. A camera comprising:
   first selection means for selecting any one of a plurality of selectable control modes;
   operation means for executing a control operation in accordance with the control mode selected by said first selection means; and
   second selection means for selecting any one of a plurality of selectable operation modes, including a first operation mode in which the control mode selected by said first selection means is automatically changed to another of said control modes in response to completion of a control operation executed by said operation means and a second operation mode in which the control mode selected by said first selection means is continued after completion of a control operation executed by said operation means.

8. A camera comprising:
   means for setting a selectable control mode to a first control mode;
   first operation means for executing a control operation in accordance with said first control mode when said first control means has been set;
   means for changing the set control mode to a second control mode;
   second operation means for executing a control operation in accordance with said second control mode when said second control mode has been set; and
   means for selecting any one of a plurality of selectable operation modes, including a first operation mode in which said second control mode is automatically changed to said first control mode in response to completion of a control operation in accordance with said second control mode and a second operation mode in which said second control mode is continued after completion of a control operation in accordance with said second control mode.

9. A camera comprising:
   first selection means for selecting either one of selectable first and second control modes;
   operation means for executing a control operation in accordance with the control mode selected by said first selection means; and
   second selection means, adapted to be operated when said second control mode has been selected, for selecting one of a plurality of selectable operation modes, including a first operation mode in which said second control mode is automatically changed to said first control mode in response to completion of a control operation executed by said operation means and a second operation mode in which said second control mode is continued after completion of a control operation executed by said operation means.

* * * * *